United States Patent [19]
Shirai

[11] Patent Number: 5,905,585
[45] Date of Patent: May 18, 1999

[54] OPTICAL BIDIRECTIONAL TRANSMISSION SYSTEM AND METHOD HAVING TRANSMISSION-LINE-DISCONNECTION DETECTING FUNCTION

[75] Inventor: Katsuhiro Shirai, Kawasaki, Japan

[73] Assignee: Fujitsu Limited, Kanagawa, Japan

[21] Appl. No.: 08/768,040

[22] Filed: Dec. 17, 1996

Related U.S. Application Data

[63] Continuation of application No. 08/303,366, Sep. 9, 1994, abandoned.

[30] Foreign Application Priority Data

Mar. 16, 1994 [JP] Japan .................................... 6-045315

[51] Int. Cl.$^6$ ............................ H04B 10/08; H04B 10/00
[52] U.S. Cl. ......................... 359/110; 359/113; 359/152; 370/242
[58] Field of Search ..................................... 370/242–250; 359/110, 113, 128, 152, 154, 177

[56] References Cited

U.S. PATENT DOCUMENTS

| | | | |
|---|---|---|---|
| 5,043,976 | 8/1991 | Abiven et al. ............................ | 359/113 |
| 5,130,837 | 7/1992 | Kitamura et al. ........................ | 359/177 |
| 5,293,260 | 3/1994 | Kikawa et al. .......................... | 359/110 |
| 5,367,395 | 11/1994 | Yajima et al. ........................... | 359/128 |

*Primary Examiner*—Leo Boudreau
*Assistant Examiner*—Bhavesh Mehta
*Attorney, Agent, or Firm*—Helfgott & Karas, PC.

[57] ABSTRACT

A first transmitting unit provided in a first station transmits a first optical signal to a second receiving unit provided in a second station via an optical transmission line, the first optical signal including first overhead information. A first receiving unit provided in the first station receives a second optical signal transmitted from a second transmitting unit provided in the second station via the optical transmission line, the second optical signal including second overhead information. A first inserting unit inserts first data for detecting line-disconnection troubles into the first overhead information, the data inserting being performed without causing a data amount of the first overhead information to be increased, contents of the first data for detecting line-disconnection troubles being different from contents of second data for detecting line-disconnection troubles being inserted into the second overhead information by a second inserting unit provided in the second station. A first extracting unit extracts the data for detecting line-disconnection troubles from the overhead information included in an optical signal received by the first receiving unit, the data for detecting line-disconnection troubles being either the second data for detecting line-disconnection troubles if the second optical signal has been received by the first receiving unit or the first data for detecting line-disconnection troubles if the first optical signal has been received by the first receiving unit as a result of returning.

10 Claims, 8 Drawing Sheets

OPTICAL BIDIRECTIONAL TRANSMISSION SYSTEM AND METHOD HAVING TRANSMISSION-LINE-DISCONNECTION DETECTING FUNCTION

This is a continuation of application Ser. No. 08/303,366, filed Sep. 9, 1994 now abandoned.

BACKGROUND OF THE INVENTION

1. Field of the Invention

The present invention relates to an optical bidirectional transmission system and method for bidirectionally transmitting an optical signal either between different terminal stations or between a terminal station and a repeater station using a new synchronous transmission method which will now be described. The new synchronous transmission method is a transmission method such as that for bidirectionally transmitting optical signals that uses a hierarchy of data sets, each data set being transferred at a predetermined reference data transfer rate and is standardized as the SDH (Synchronous Digital Hierarchy) or the SONET (Synchronous Optical Network). See a standard No.TR-NWT-000253 for the SONET and CCITT G.707, 708, and 709 for the SDH. The present invention particularly relates to a provision to be provided for such an optical bidirectional transmission system and method, the provision properly detecting a trouble of transmission-line disconnection in the system and method.

The SDH has been determined by CCITT (International Telegraph and Telephone Consultative Committee, now being an ITU-TS (International Telecommunication Union-Telecommunication Standardization Section)). In the SDH, a final data transfer rate is obtained from multiplying an integer by a predetermined reference data transfer rate of 155.52 Mbps (referred to as STM-1). Currently, a data transfer rate of 622.08 Mbps (STM-4) obtained from multiplying the STM-1 by 4 and a data transfer rate of 2.48832 Gbps (STM-16) obtained from multiplying the STM-1 by 16 have been standardized.

The above-mentioned SONET uses a basic rate of 51.84 Mbps (OC-1) and has standardized a data transfer rate of 155.52 Mbps (OC-3) obtained from multiplying the OC-1 by 3, data transfer rate OC-12 obtained from multiplying the OC-3 by 4 and data transfer rate OC-48 obtained from multiplying the OC-3 by 16. Thus, the data transfer rates OC-3, OC-12 and OC-48 standardized in the SONET correspond to the data transfer rates STM-1, STM-4 and STM-12 standardized in the above SDH.

2. Prior Art

Various optical transmission methods have been proposed and made practicable, the optical transmission methods using optical signals obtained from converting electric signals thereto and using optical fibers serving as optical transmission lines. Either a method or a system connecting optical multiplexer-demultiplexers to an optical transmission line so as to bidirectionally transmit optical signals via the optical transmission line has been known. Such optical transmission methods are applied to the above new synchronous transmission method as described above and the bidirectional optical signal transmission can be performed in the new synchronous transmission method.

Further, data multiplexing is performed in the new synchronous transmission method as follows: 24 channels, each channel consisting of 64 kbps of information (corresponding to one channel in a standard telephone data transfer rate), for example, are multiplexed so as to obtain 1.5 Mbps of information. 4 sets of information, each set consisting of the 1.5 Mbps of information, are multiplexed so as to obtain 6 Mbps of information. 7 sets of information, each set consisting of the 6 Mbps of information, are multiplexed so as to obtain 50 Mbps of information. 3 sets of information, each set consisting of 50 Mbps are multiplexed so as to obtain 150 Mbps of information. Thus, the above-described data transfer rate STM-1 (corresponding to 2016 channels in the standard telephone data transfer rate) is obtained. A data frame of the rate STM-1 can be represented by a two-dimensional byte arrangement of 9 rows×270 columns. A data frame of a rate STM-0 being ⅓ of the rate STM-1 can be represented by a two-dimensional byte arrangement of 9 rows×20 columns, corresponding to a data transfer rate of 51.84 Mbps (corresponding to 672 channels in the standard telephone data transfer rate).

Either a method or a system is assumed in which an optical transmission station and an optical reception station are connected to an optical transmission line via optical multiplexer-demultiplexers, respectively, and the optical transmission line is used to bidirectionally transmit optical signals. In such a method or a system, if a line-disconnection trouble occurs in the optical transmission line, the optical signals are reflected by a part of the transmission line at which the line-disconnection trouble has occurred. The thus reflected optical signals are thus returned to the optical transmission and reception stations, respectively. Since the thus returned optical signals have signal levels similar to those which normally transmitted optical signals have, such a line-disconnection trouble cannot be detected by only monitoring the signal levels of the received optical signals.

Provisions to add an extra bit for detecting line-disconnection troubles in the transmission data frame has been proposed. The provisions will now be described with reference to FIG. 1. An optical transmission system shown in FIG. 1 includes two stations A and B, multiplexers (MUX) 111a and 111b and demultiplexers (DMUX) 112a and 112b being connected to an optical transmission line 114 via optical-electric signal-converting, optical multiplexer-demultiplexers 113a and 113b. Optical signals are bidirectionally transmitted between the stations A and B via the optical transmission line 114. In a case of an example, a setting unit 115a provided in the multiplexer 111a of the station A is assumed to set an extra bit for detecting line-disconnection troubles to be the logical value "0" (low level), while a setting unit 115b provided in the multiplexer 111b of the station B is assumed to set an extra bit for detecting line-disconnection troubles to be the logical value "1" (high level).

An exclusive OR device 116b in the demultiplexer 112b of the station B compares the extra bit for detecting line-disconnection troubles sent from the station A with a reference logical value "0". If no line-disconnection trouble occurs in the transmission line 114, since the extra bit is thus identical to the reference logical value "0", the exclusive OR device 116b provides an output signal having the logical value "0" being provided to an OR device 117b in the demultiplexer 112b. An ER signal is also provided to the OR device 117b and is supplied by an error detecting unit detecting errors which may occur in the station B. The ER signal has the logical value "1" only when the error detecting unit has detected an error in the station B. Thus, if the signal supplied by the exclusive OR device 116b and the signal ER have the logical values "0", the OR device 117b provides an alarm signal ALM having the logical value "0" indicating errors occur neither in the station B nor in the transmission line 114.

Similarly, an exclusive OR device 116a in the emultiplexer 112a of the station B compares the extra bit for detecting line-disconnection troubles sent from the station B with a reference logical value "1". If no line-disconnection trouble occurs in the transmission line 114, since the extra bit is thus identical to the reference logical value "1", the exclusive OR device 116a provides an output signal having the logical value "0" being provided to an OR device 117a in the demultiplexer 112a. An ER signal is also provided to the OR device 117a and is supplied by an error detecting unit detecting errors which may occur in the station A. The ER signal has the logical value "1" only when the error detecting unit has detected an error in the station A. Thus, if the signal supplied by the exclusive OR device 116a and the signal ER have the logical values "0", the OR device 117a provides an alarm signal ALM having the logical value "0" indicating errors occur neither in the station A nor in the transmission line 114.

If a line-disconnection trouble occurs in a middle of the transmission line 114, optical signals including the extra bits for detecting line-disconnection troubles are reflected at the middle of the transmission line 114 as indicated by broken lines in FIG. 1. Thus, the extra bit for detecting line-disconnection troubles of "0" sent from the station A is supplied to the exclusive OR device 116a in the demultiplexer 112a and the device 116a compares the thus supplied extra bit of "0" with the reference logical level "1". The device 116a therefore outputs a signal of "1" and the OR device 117a outputs the alarm signal ALM of "1". Similarly, the extra bit for detecting line-disconnection troubles of "1" sent from the station B is supplied to the exclusive OR device 116b in the demultiplexer 112b and the device 116a compares the thus supplied extra bit of "1" with the reference logical level "0". The device 116b therefore outputs a signal of "1" and the OR device 117b outputs the alarm signal ALM of "1". Thus, the line-disconnection trouble can be detected.

However, in such a method for detecting line-disconnection troubles, addition of extra bits for detecting line-disconnection troubles added to optical signals degrade transmission efficiency. Further, extra provision is necessary to be made in the multiplexer and demultiplexer of each station for adding the extra bits and extracting the extra bits from a received optical signal, thus increasing costs of the transmission station equipment.

SUMMARY OF THE INVENTION

An object of the present invention is to enable detecting a line-disconnection trouble by only adding a relatively simple provision.

In order to achieve the object, an optical bidirectional transmission system and method according to the present invention use an overhead channel of bytes being a channel added to a head of multiplexed-user-data carrying channels in a standardized transmission format. The overhead channel of bytes is provided for carrying information indicating overall structure of the data transmission format of information transmitted through the optical bidirectional transmission system and method. The information carried on the overhead channel enables appropriate and efficient processing of user data being multiplexed/demultiplexed in transmitters/receivers according to the new synchronous transmission methods. The above-mentioned standardized transmission format is in accordance with a standard of one of the above-described new synchronous transmission methods. Specifically, as the overhead channel of bytes has normally a number of spare bytes which have not been used, some predetermined bytes of the spare bytes are used as data (bits) for detecting line-disconnection troubles such as those described above according to the present invention.

The transmitters/receivers according to the standards of the new synchronous transmission methods have terminals thereon according to the standard for inputting the overhead channel of information into the transmitters and terminals for taking the overhead channel of information out from the receivers. Thus, no special provision is necessary to be made in the transmitters/receivers for adding the data for detecting line-disconnection troubles to the optical signals to be transmitted via the transmission line and for extracting the data for detecting line-disconnection troubles from the optical signals having been transmitted via the transmission line. Only a provision of apparatus is necessary, the apparatus to be directly coupled with the above terminals for handling the overhead channel of information, the apparatus setting the data for detecting line-disconnection troubles on the above-mentioned predetermined bytes in the overhead channel and extracting the data for detecting line-disconnection troubles from the predetermined bytes in the overhead channel. The above apparatus then compares the extracted data with the set data so as to detect line-disconnection troubles similarly to the line-disconnection trouble detecting method described with reference to FIG. 1.

The provision of the above apparatus is not as troublesome as making provisions inside the transmitters/receivers. Thus, costs necessary to be taken for enabling detecting line-disconnection troubles can be reduced. Further, since the overhead channel is a channel mandatorily provided in the standardized data transmission format, using the spare bytes of the overhead channel does not degrade transmission efficiency of the data transmission system.

Other objects and further features of the present invention will become more apparent from the following detailed description when read in conjunction with the accompanying drawings.

DESCRIPTION OF THE PREFERRED EMBODIMENTS

Figure 2:
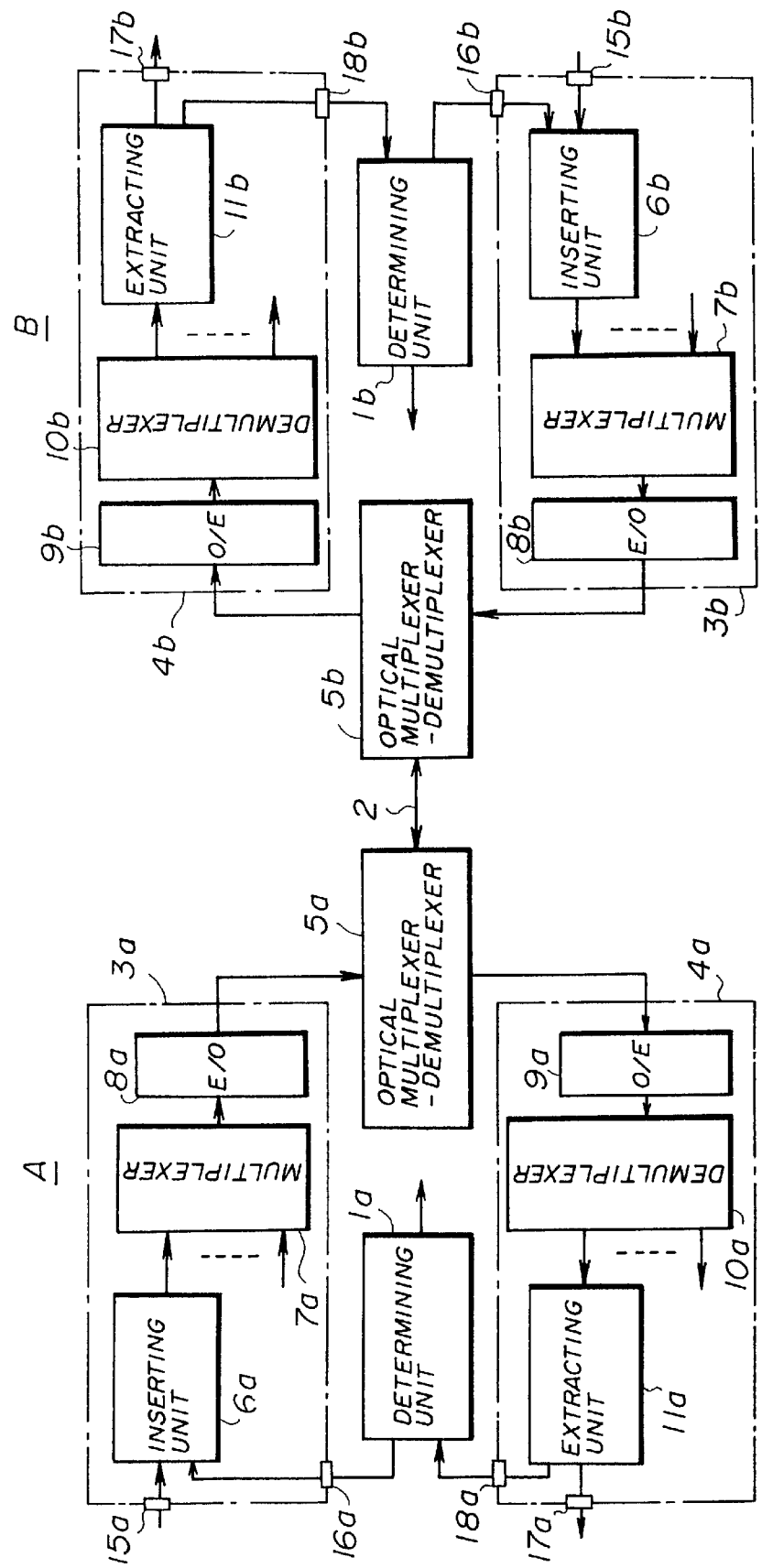
FIG. 2 shows a block diagram of a transmission system in a first embodiment of an optical bidirectional transmission system and method according to the present invention.

With reference to FIG. 2, a first embodiment of an optical bidirectional transmission system and method according to the present invention will now be described. A description of a transmission system in the first embodiment shown in FIG. 2 is a general description which may be further generally applied to transmission systems in a second embodiment, a third embodiment, a fourth embodiment and a fifth embodiment of the present invention shown in FIGS. 3, 4, 5, 6 and 7 which will be described later. The transmission system in the first embodiment shown in FIG. 2 is in accordance with a standard of one of the above-described new synchronous transmission methods and bidirectionally transmits optical signals with a data transmission format also in accordance with the above standard. Information is appropriately allocated in the above data transmission format so as to be transmitted through the system. The system includes stations A and B and the bidirectional optical-signal transmission is performed between the stations A and B. Each station of the stations A and B has a respective one of transmitters 3a and 3b and a respective one of receivers 4a and 4b. Each station of the stations A and B further has a respective one of determining units 1a and 1b for detecting line-disconnection troubles which may occur in an optical transmission line 2 connecting the two stations A and B as shown in the figure. Each of the determining units 1a and 1b is coupled to a respective one of the transmitters 3a and 3b via a respective one of connecters 16a and 16b for the overhead channel and is further coupled to a respective one of the receivers 4a and 4b via a respective one of terminals 18a and 18b for the overhead channel. Such terminals as the terminals 16a, 16b, 18a and 18b are provided for operators of the stations A and B to set appropriate information in and/or to take information from the overhead channel. Thus, apparatuses other than the determining units 1a and 1b are coupled to the terminals 16a, 16b, 18a and 18b for the operators to set appropriate information in and/or to take information from the overhead channel.

Figure 1:
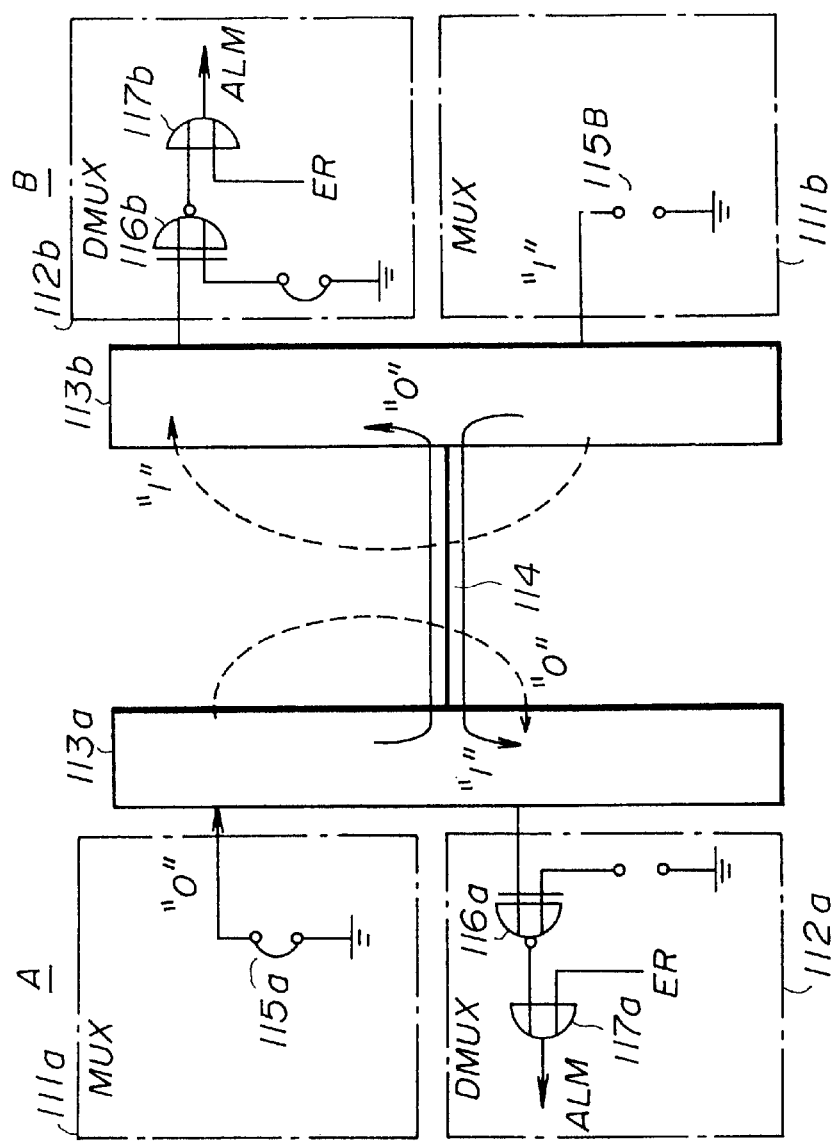
FIG. 1 shows a block diagram of a transmission system in the prior art.

The determining units 1a and 1b of the stations A and B insert different data for detecting line-disconnection troubles into the overhead channel being part of the transmission format of information to be transmitted to opposite stations of the stations A and B via the transmission line 2. Thus, the data for detecting line-disconnecting trouble is transmitted to the opposite stations. The determining units 1a and 1b receive the overhead channels of bytes as part of data channels in the standardized data transmission format, the data channels of information having been transmitted via the transmission line 2. The determining units 1a and 1b then extract the data for detecting line-disconnection troubles from the overhead channel. Each of the determining units 1a and 1b compares the thus extracted data for detecting line-disconnection troubles with the other data for detecting a line-disconnecting trouble having been transmitted by the determining unit. A logic in principle of the detecting line-disconnection troubles is the same as that described with reference to FIG. 1. The detecting logic is based on the following fact: The transmitted data for detecting line-disconnection troubles is different from the received data for detecting line-disconnection troubles if no line-disconnection troubles occur in the line 2 since the two determining units 1a and 1b transmit the different data for detecting a line-disconnecting trouble; and the transmitted data for detecting line-disconnection troubles is identical to the received data for detecting line-disconnection troubles if a line-disconnection trouble occurs in the line 2 since a disconnected part of the transmission line 2 reflects the transmitted optical signals so that the data for detecting line-disconnection troubles once output from each of the determining units 1a and 1b is returned to the determining unit. Therefore, each of the determining units 1a and 1b determines that a line-disconnection trouble occurs in the transmission line 2 if the transmitted data for detecting line-disconnection troubles is identical to the received data for detecting line-disconnection troubles.

Further, as shown in FIG. 2, the transmitters 3a and 3b include inserting units 6a and 6b for inserting the data for detecting line-disconnection troubles into the overhead channel of the standardized data transmission format. Connectors 15a and 15b for inputting user data to be multiplexed in the standardized transmission format are also provided on the transmitters 3a and 3b and are coupled to the inserting units 6a and 6b, respectively. Multiplexers 7a and 7b in the transmitters 3a and 3b appropriately multiplex the data supplied by the inserting units 6a and 6b with other user data supplied by other provisions in the transmitters 3a and 3b not shown in the figure also coupled to the multiplexers 7a and 7b. Electrical-optical signal converters (E/O) 8a and 8b in the transmitters 3a and 3b convert the signals multiplexed in the multiplexers 7a and 7b into corresponding optical signals.

Optical-electric signal converters (O/E) 9a and 9b in the receivers 4a and 4b convert optical signals into corresponding electric signals. Demultiplexers 10a and 10b in the receivers 9a and 9b demultiplex the multiplexed data carried on the electric signals. The thus demultiplexed data is distributed to the extracting units 11a and 11b and to other provisions in the receivers 4a and 4b not shown in the figure. The above-mentioned other provisions handles relevant user data having been carried on the optical signals via the transmission line 2 and output the data from the receivers 4a and 4b to relevant users. The extracting units 11a and 11b extract the data for detecting line-disconnection troubles from the overhead channel included in the thus demultiplexed data supplied to the extracting units 11a and 11b. The extracting units 11a and 11b further extract relevant user data from the demultiplexed data supplied to the extracting units 11a and 11b.

Each of stations A and B has a relevant one of the optical multiplexer-demultiplexers 5a and 5b for coupling a relevant one of the transmitters 3a and 3b and a relevant one of the receivers 4a and 4b to the transmission line 2. The optical multiplexer-demultiplexers 5a and 5b enable bidirectional optical-signal transmission. Thus data is transmitted from the transmitter 3a of the station A to the receiver 4b of the station B via the transmission line 2 while data is transmitted from the transmitter 3b of the station B to the receiver 4a of the station A via the transmission line 2.

The determining units 1a and 1b set the data for detecting line-disconnection troubles on predetermined bytes of the overhead channel, via the terminals 16a and 16b, to be transmitted. The determining units 1a and 1b take the data for detecting line-disconnection troubles from the predetermined bytes of the overhead channel, via the terminals 18a and 18b, having been transmitted. The determining units 1a and 1b then compare the data being sent via the terminals 16a and 16b with the data being received via the terminals 18a and 18b so as to determine whether a line-disconnection trouble has occurred according to the above-described logic.

The overhead channel in the standardized data transmission format according to the standards of the new synchronous transmission methods includes frame synchronous bytes, identification bytes, error monitoring bytes, order wire bytes, data communication bytes and so forth. The overhead channel is a channel mandatorily provided in the data transmission format as mentioned above. Thus, using the spare bytes of the channel does not degrade transmission efficiency of the transmission system as mentioned above. Further, inserting units and extracting units such as the units 6a, 6b, 11a and 11b shown in FIG. 2 are mandatorily provided in the transmitters/receivers such as those shown in the figure for handling the mandatory overhead channel of information accordingly. The transmission system shown in the figure uses those inserting units and extracting units for setting the data for detecting line-disconnection troubles on the optical signals to be transmitted/taking the data for detecting line-disconnection troubles from the optical signals having been transmitted. Further, the transmission system shown in FIG. 2 requires, for enabling detecting of a line-disconnecting trouble, only provisions of the determining units 1a and 1b to be connected to the terminals 16a, 16b, 18a and 18b of the transmitters/receivers 3a, 3b, 4a and 4b. Further, the determining units 1a and 1b can be embodied in relatively simple structures. Thus, as mentioned above, a cost increase required for the transmission system to have the function of detecting line-disconnection troubles can be reduced and provision of the function improves reliability of the transmission.

Further, a variant of the transmission system shown in FIG. 2 will now be described, the system shown in FIG. 2 connecting a single pair of the transmitter 3a and receiver 4a to the transmission line 2 via the optical multiplexer-demultiplexer 5a, connecting a single pair of the transmitter 3b and receiver 4b to the transmission line 2 via the optical multiplexer-demultiplexer 5b, and performing bidirectional optical-signal transmission between the stations A and B. In the variant, each station of the stations A and B has a plurality of pairs of transmitters and receivers, each pair being coupled with one another through a relevant optical multiplexer-demultiplexer. The above optical multiplexer-demultiplexers are then optically coupled with one another through another overall optical multiplexer-demultiplexer. The overall optical multiplexer-demultiplexer performs optical wave-length multiplexing-demultiplexing so as to transmit data output from the transmitters of all the above pairs and so as to distribute appropriate data to the receivers of all the pairs. In such a case as that of the above-described variant, a relevant one of the determining units 1a and 1b is provided for each pair of the above pairs so as to perform the detection of line-disconnection troubles.

Figure 3:
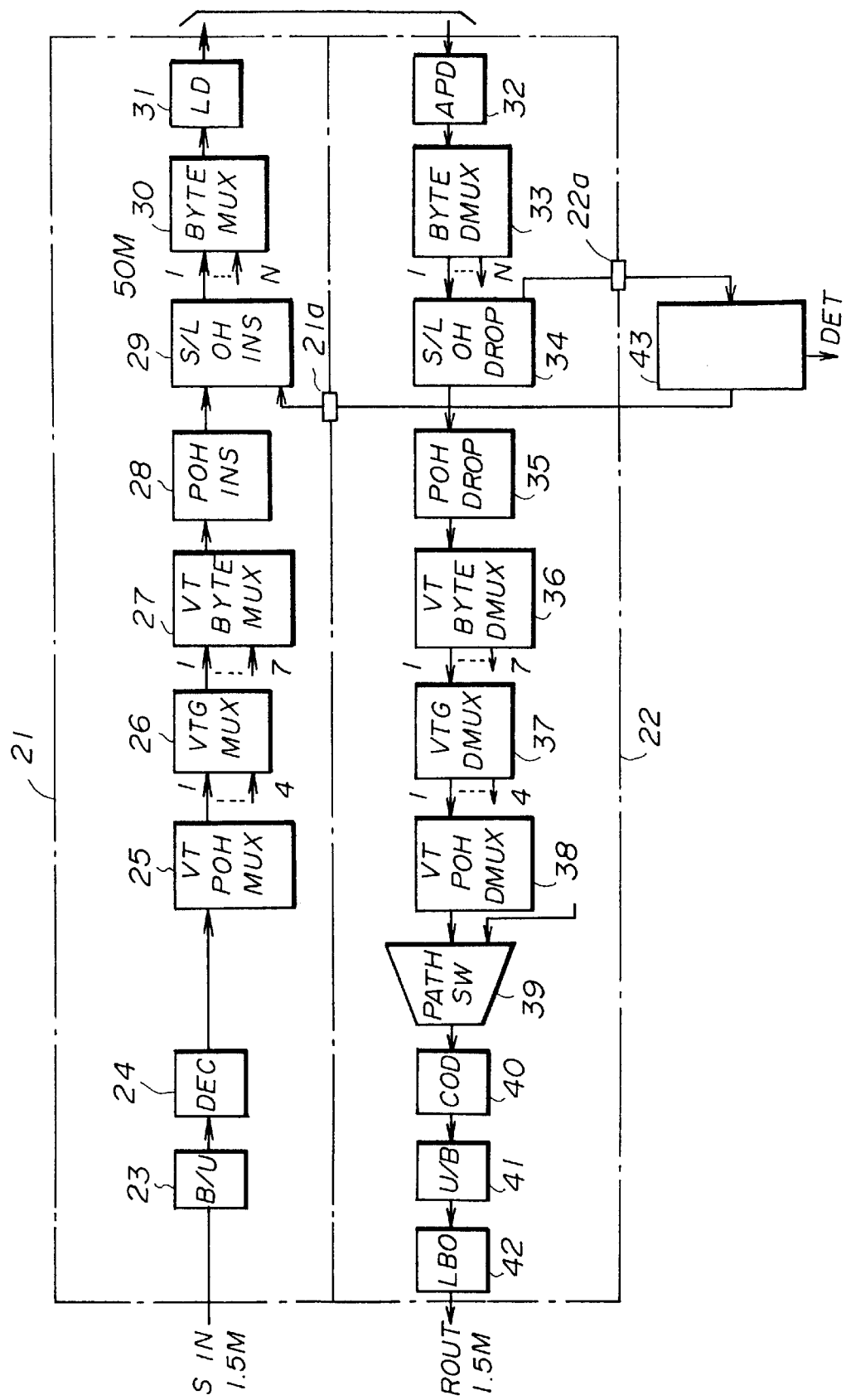
FIG. 3 shows a block diagram of a transmission system in a second embodiment of an optical bidirectional transmission system and method according to the present invention.

With reference to FIG. 3, a transmitter 21, a receiver 22 and a determining unit 43 in a second embodiment of a bidirectional optical transmission system and method according to the present invention will now be described. These transmitter 21 and receiver 22 having structures according to a standard of the above-described known new synchronous transmission methods, are used in a bidirectional optical transmission system for transmitting optical signals having any of data transfer rates of 150 Mbps, 600 Mbps, and 2400 Mbps. These data transfer rates are obtained as a result of multiplexing a relevant number of low-order data transfer rate signals, a data transfer rate of each of the signals being of 1.5 Mbps. A converter (B/U) 23 converts an input bipolar transmission signal SIN into a corresponding known-AMI/B8ZS-code unipolar signal and a decoder (DEC) 24 converts the unipolar signal into a corresponding known-NRZ-code signal.

A multiplexer (VT POH MUX) 25 multiplexes given VT-level path overhead bytes with the NRZ-code signal for each 1.5 Mbps of the signal. Another multiplexer (VTG MUX) 26 four-multiplexes, that is, multiplexes a 1.5 Mbps signal output from the multiplexer 25 with three other 1.5 Mbps signals similar to the signal output from the multi- plexer 25 so that a signal of 6 Mbps is obtained. Another multiplexer (VT BYTE MUX) 27 seven-multiplexes, that is, multiplexes a 6 Mbps signal output from the multiplexer 26 with six other 6 Mbps signals similar to the signal output from the multiplexer 26 so that a signal of 45 Mbps is obtained. An inserting unit (POH INS) 28 multiplexes a given path overhead bytes (the term 'path overhead bytes' being referred to as POH, hereinafter) concerning the thus obtained 45 Mbps signal so that the POH are allocated at relevant POH overhead channels in a relevant standardized data transmission format.

An inserting unit (S/L OH INS) 29 acting as one of the inserting units 6a and 6b shown in FIG. 2 multiplexes section overhead bytes (the term 'section overhead bytes' being referred to as SOH, hereinafter) and line overhead bytes (the term 'line overhead bytes' being referred to as LOH, hereinafter) with the above 45 Mbps signal including the previously multiplexed POH so that a 50 Mbps signal (STS-1) is obtained. Thus, the SOH and LOH are allocated at relevant POH overhead channels in the relevant standardized data transmission format. A multiplexer (BYTE MUX) 30 acting as one of the multiplexers 7a and 7b shown in FIG. 2 N-multiplexes. That is, if N is assumed to be 3, the multiplexer 30 multiplexes the above 50 Mbps signal output from the inserting unit 29 with two other 50 Mbps signals similar to the signal output from the multiplexer 29 so that a signal of 150 Mbps is obtained. Similarly, if N is assumed to be 12, a 600 Mbps signal is obtained as a result. Further, if N is assumed to be 48, a 2.4 Gbps signal is obtained as a result. A semiconductor laser device (LD) 31 acting as one of the electric-optical signal converters 8a and 8b shown in FIG. 2 converts the signal output from the multiplexer 30 into a corresponding optical signal and an optical multiplexer-demultiplexer, acting as one of the optical multiplexer-demultiplexers 5a and 5a shown in FIG. 2, not shown in the figure, is used to send out the optical signal to an optical transmission line.

The receiver 22 processes a received optical signal reversely to the above-described processing performed by the transmitter 21. The above optical multiplexer-demultiplexer is used to take the optical signal from an optical transmission line. An avalanche photo-diode (APD) 32 acting as one of the optical-electric signal converters 9a and 9b converts the optical signal into a corresponding electric signal. A demultiplexer (BYTE DMUX) 33 acting as the demultiplexers 10a and 10b shown in FIG. 2 N-demultiplexes the electric signal so as to obtain N signals previously N-multiplexed in the electric signal. An extracting unit (S/L OH DROP) 34 acting as one of the above extracting units 11a and 11b shown in FIG. 2 demultiplexes SOH and LOH from one of the N-demultiplexed signals. An extracting unit (POH DROP) 35 then demultiplexes the POH from the signal.

A demultiplexer (VT BYTE DMUX) 36 seven-demultiplexes so as to obtain seven 6 Mbps signals. A demultiplexer (VTG DMUX) 37 four-demultiplexes one of the seven 6 Mbps signals so as to obtain four 1.5 Mbps signals. A demultiplexer (VT POH DMUX) 38 demultiplexes the VT-level path overhead bytes (VT POH) from one of the four 1.5 Mbps signals. A path switching unit (PATH SW) 39 is used to switch a data transmission path to be used from a path having a trouble to a normal path if the transmission system uses a double-ring network. The signal passing through the PATH SW 39 is then applied to a coder (COD) 40 then converting the applied signal of the NRZ-code into a corresponding AMI/B8ZS-code signal. A converter (U/B) 41 converts a unipolar signal of the AMI/B8ZS-code signal into a corresponding bipolar signal. A line building-out unit (LBO) 42 is used to perform, on the bipolar signal, processes such as gain-setting matching a transmitted distance. The 1.5 Mbps received signal ROUT is output via the LBO 42.

A transmitter and a receiver for performing bidirectional optical-signal transmission according to a standard of the new synchronous transmission methods have structures substantially identical to the above-described structures of the transmitter 21 and receiver 22, in general. A determining unit 43 acting as one of the determining units 1a and 1b shown in FIG. 2 is provided for such common structures as those shown in FIG. 3, the determining unit 43 being coupled with the inserting unit 29 in the transmitter 21 via a terminal 21a and coupled with the extracting unit 34 in the receiver 22 via a terminal 22a. The determining unit 43 uses the data for detecting line-disconnection troubles being inserted in the LOH being then inserted into the relevant overhead channel of the standardized transmission format of the transmission signal through the inserting unit 29. The determining unit 43 further uses the data for detecting line-disconnection troubles having been extracted from the LOH having been demultiplexed from the relevant overhead channel in the standardized transmission format of the received signal through the extracting unit 34. The determining unit 43 compares the above data for detecting line-disconnection troubles being inserted in the LOH and data for detecting line-disconnection troubles having been extracted from the LOH. If the former data is identical to the latter data, this fact indicating that a line-disconnection trouble has occurred so that an optical signal transmitted from the transmitter 21 is returned so as to be received by the receiver 22, the determining unit 43 outputs a line-disconnection detection signal DET to a supervisory apparatus or the like.

Figure 4:
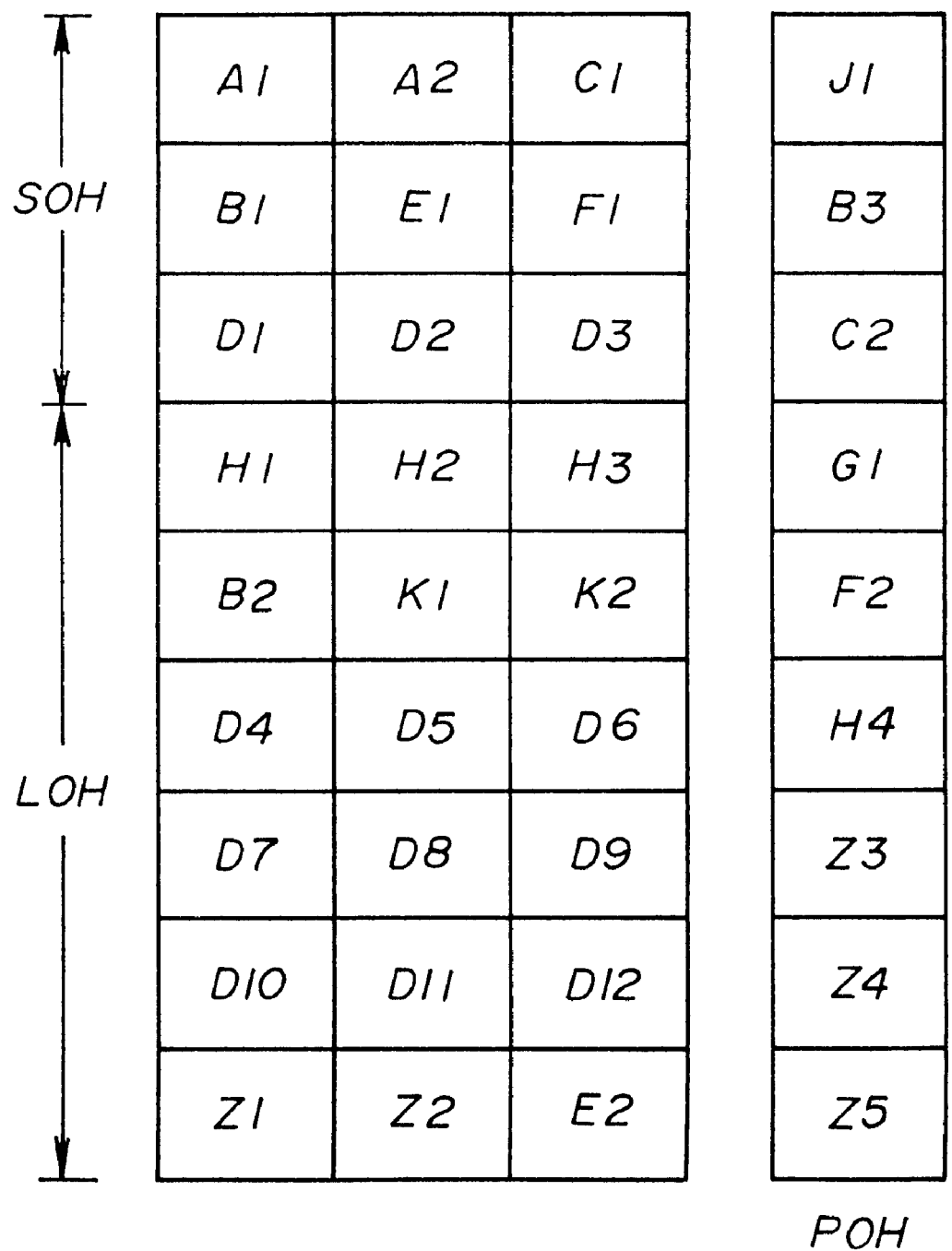
FIG. 4 illustrates data allocation in an overhead channel.

With reference to FIG. 4, an overhead-byte (PATH, SOH and LOH) formation in the standardized transmission format according to the above-described SONET will now be described. A corresponding overhead-bite formation according to the above-described SDH is substantially identical to the formation according to the SONET. In SOH, bytes A1 and A2 are frame synchronous bytes, A1="11110110" and A2="00101000". A byte C1 is an STM identification byte. Bytes B1 is an error monitoring byte to be used if an error monitoring method BIP-8 (bit interleaved parity 8) being a method of separately monitoring each 8 bits is applied. A byte E1 is an order wire byte for performing a voice meeting between operators; a byte F1 is a user byte freely usable by a user of a relevant network: and bytes D1–D3 are data communication bytes for performing data communication for a repeater section.

Bytes H1–H3 are pointer bytes serving as an AU (Administrative Unit) ponter. A byte B2 is an error monitoring byte to be used if an error monitoring method BIP-N·24 being a method of separately monitoring each N times 24 bits is applied. Bytes K1 and K2 are APS (automatic protection switch) bytes; bytes D4–D12 are data communication bytes for performing data communication for a multiple section; bytes Z1 and Z2 are spare bytes; and a byte E2 is an order wire byte for performing a voice meeting for a multiple section.

In the POH, a byte J1 is a byte indicating a position of a first byte in a virtual container, the position of the byte J1 being specified by the above-mentioned AU pointer. A byte B3 is a path monitoring byte to be used if the BIP-8 monitoring method is applied. A byte C2 is a byte indicating a formation of either a VC-3 (48.96 Mbps virtual container) or a VC-4 (150 Mbps virtual container). A byte G1 is a path-state indicating byte; a byte F2 is a user byte similar to the above-mentioned user byte F1; a byte H4 is a position-indicating byte; and bytes Z3–Z4 are spare bytes.

As described above, a feature of the present invention is to use bytes in the above overhead bytes for carrying the data for detecting line-disconnection troubles, the bytes to be used being bytes which have not been used or which have not been defined. In a case of an example, one or a plurality of bytes in the above data communication bytes D4–D12 are used for carrying the data for detecting line-disconnection troubles. In FIG. 3, in a first station, the determining unit 43 inputs, at the terminal 21a, the data for detecting line-disconnection troubles as the above data communication bytes D4–D12 among the LOH to be multiplexed, by means of the inserting unit 29, with the data output from the inserting unit 28. The thus input data for detecting line-disconnection troubles has contents different from the contents of the data for detecting line-disconnection troubles being similarly input at a second station opposite to the first station. The LOH demultiplexed by means of the extracting unit 34 from the data output from the demultiplexer 33 is used, via the terminal 22a, by the determining unit 43 to appropriately extract the data for detecting line-disconnection troubles from the LOH, the data for detecting line-disconnection troubles having been input in the second station. The determining unit 43 compares the data being input at the terminal 21a with the data being obtained via the terminal 22a as described above.

Since the contents of the data for detecting line-disconnection troubles input at the first station are different from those input at the second station as mentioned above, the above comparison by means of the determining unit 43 results in that the input data is different from the obtained data if the relevant transmission line has no troubles. If a line-disconnection trouble occurs in the transmission line, since a part in the transmission having the trouble reflecting optical signals coming from the two stations, the once input data at a station is then received by the same station. Thus, the above comparison by means of the determining unit 43 results in that the input data is identical to the obtained data. Thus, as mentioned above, the determining unit 43 outputs the DET signal. As described above, the detection of line-disconnection troubles is enabled by providing only the determining unit 43 having a relatively simple structure to be coupled to the inserting unit 29 via the terminal 21a and the extracting unit 34 via the terminal 22a.

Figure 5:
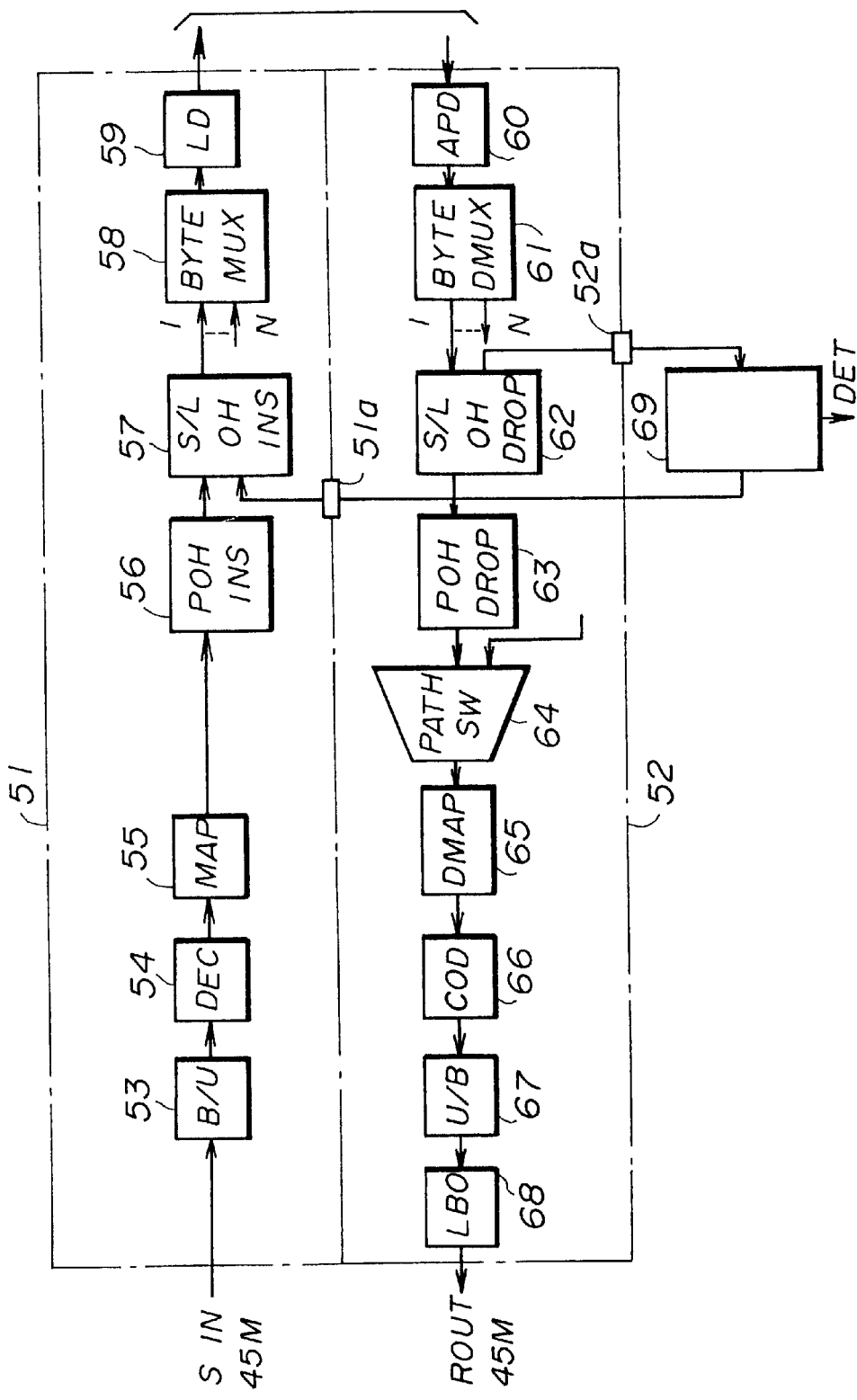
FIG. 5 shows a block diagram of a transmission system in a third embodiment of an optical bidirectional transmission system and method according to the present invention.

With reference to FIG. 5, a transmitter 51, a receiver 52 and a determining unit 69 in a third embodiment of a bidirectional optical transmission system and method according to the present invention will now be described. These transmitter 51 and receiver 52 having structures according to a standard of the above-described known new synchronous transmission methods, are used in a bidirectional optical transmission system for transmitting an optical signal having a data transfer rate obtained as a result of multiplexing a number of low-order 45 Mbps signals. A 45 Mbps transmission signal SIN (bipolar signal) is converted by a converter (B/U) 53 in the transmitter 51 into a corresponding unipolar signal. The unipolar signal of a B3ZS-code signal is then converted, by means of a decoder (DEC) 54, into a corresponding NRZ-code signal. A mapping unit (MAP) 55 maps the unipolar signal of the 45 Mbps signal on a payload in a SONET STS-1.

An inserting unit (POH INS) 56 multiplexes a POH concerning the 45 Mbps signal with the above-mapped 45 Mbps signal. Another inserting unit (S/L OH INS) 57 multiplexes SOH and LOH with the signal output from the inserting unit 56 so as to obtain a 50 Mbps signal (STS-1). A multiplexer (BYTE MUX) 58 N-multiplexes N signals including the above 50 Mbps signal and N-1 similar signals with one another. A signal obtained as a result of the above multiplexing is converted into a corresponding optical signal through a semiconductor laser device (LD) 59 and then sent out to a relevant optical transmission line via an optical multiplexer-demultiplexer not shown in the figure.

The receiver 52 processes a received optical signal reversely to the above-described processing performed by the transmitter 51. An avalanche photo-diode (APD) 60 acting as an optical-electric signal converter converts the optical signal into a corresponding electric signal. A demultiplexer (BYTE DMUX) 61 N-demultiplexes the electric signal, and an extracting unit (S/L OH DROP) 62 demultiplexes SOH and LOH from one of the N demultiplexed signals. An extracting unit (POH DROP) 63 then demultiplexes the POH from the signal.

The signal is passed through a path switch unit (PATH SW) 64 and is applied to a demapping unit (DMAP) 65. The demapping unit 65 takes data from the payload in the STS-1 of the applied signal. A coder (COD) 66 converts the taken data of a NRZ-code signal into a corresponding B8ZS-code signal. A converter (U/B) 67 converts the B8ZS-code signal of a unipolar signal into a corresponding bipolar signal being then output as a received signal ROUT of the 45 Mbps signal via a line building-out unit (LBO) 68.

A determining unit 69 is coupled with the inserting unit 57 in the transmitter 51 via a terminal 51*a* and coupled with the extracting unit 62 in the receiver 52 via a terminal 52*a*. The determining unit 69 uses the data for detecting line-disconnection troubles being inserted in the LOH being then inserted into the relevant overhead channel of the standardized transmission format of the transmission signal through the inserting unit 57. The determining unit 69 further uses the data for detecting line-disconnection troubles having been extracted from the LOH having been demultiplexed from the relevant overhead channel in the standardized transmission format of the received signal through the extracting unit 62. The determining unit 69 compares the above data for detecting line-disconnection troubles being inserted in the LOH and data for detecting line-disconnection troubles having been extracted from the LOH. If the former data is identical to the latter data, this fact indicating that a line-disconnection trouble has occurred so that an optical signal transmitted from the transmitter 51 is returned so as to be received by the receiver 52, the determining unit 69 outputs a line-disconnection detection signal DET to a supervisory apparatus or the like. The determining unit 69 has functions substantially identical to the determining unit 43 shown in FIG. 3 and has functions adaptable for the transmission system including the transmitter 51 and receiver 52 shown in FIG. 5.

Figure 6:
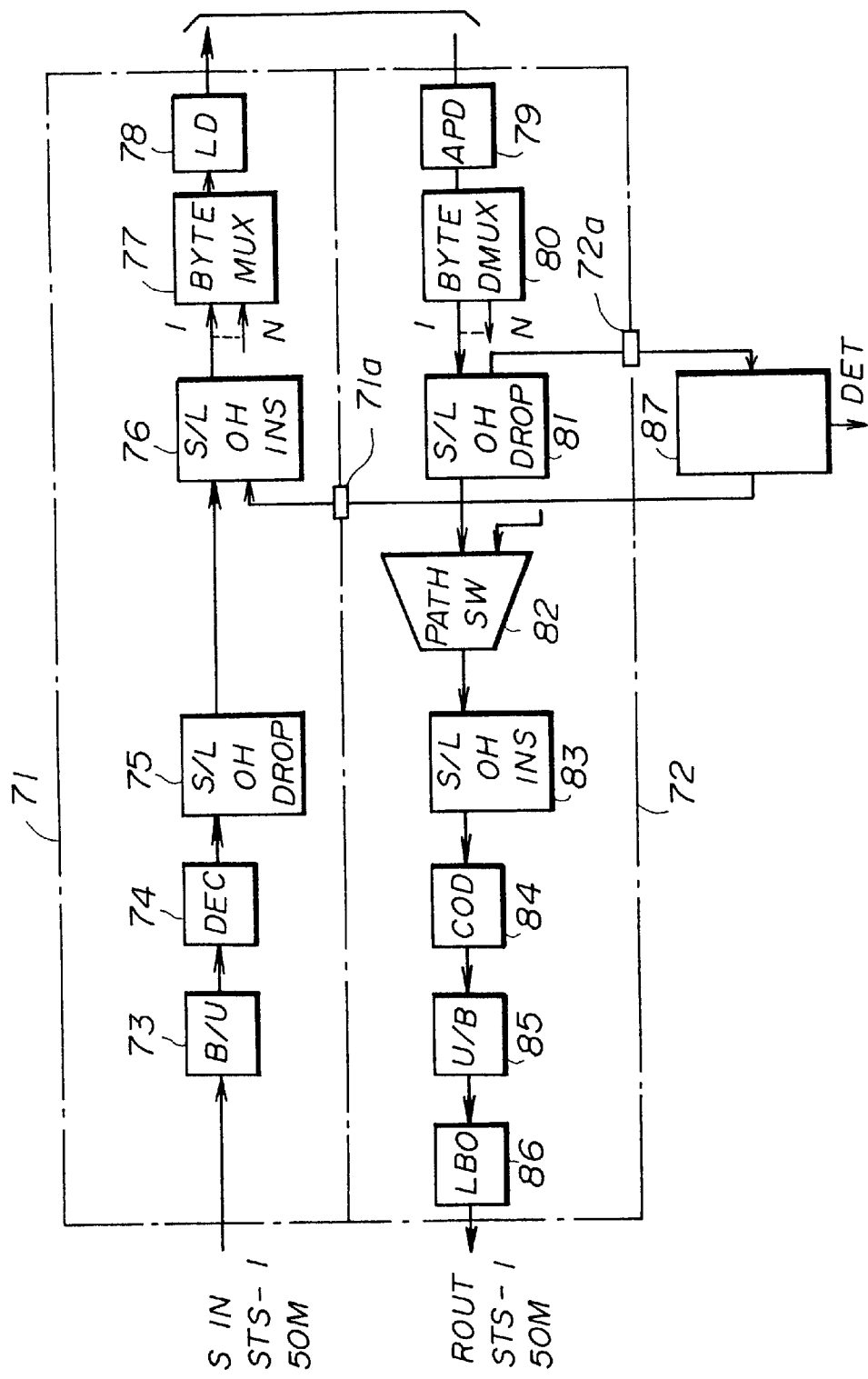
FIG. 6 shows a block diagram of a transmission system in a fourth embodiment of an optical bidirectional transmission system and method according to the present invention.

With reference to FIG. 6, a transmitter 71, a receiver 72 and a determining unit 87 in a fourth embodiment of a bidirectional optical transmission system and method according to the present invention will now be described. These transmitter 71 and receiver 72 having structures according to a standard of the above-described known new synchronous transmission methods, are used in a bidirectional optical transmission system for transmitting an optical signal having a data transfer rate obtained as a result of multiplexing a number of low-order 50 Mbps STS-1 signals. A 50 Mbps transmission signal SIN (bipolar signal) is converted by a converter (B/U) 73 in the transmitter 51 into a corresponding B3ZS-code unipolar signal. The B3ZS-code unipolar signal is then converted, by means of a decoder (DEC) 74, into a corresponding NRZ-code signal. A separating unit (S/L OH DROP) 75 separates SOH and LOH for the low-order signals from the input signal. An inserting unit (S/L OH INS) 76 multiplexes SOH and LOH for a high-order signal with the input signal. A multiplexer (BYTE MUX) 77 N-multiplexes the above signal with other similar signals. A signal obtained as a result of the above multiplexing is converted into a corresponding optical signal through a semiconductor laser device (LD) 78 and is sent out to a relevant optical transmission line via an optical multiplexer-demultiplexer not shown in the figure.

In the receiver 72, an optical signal is input via the above multiplexer-demultiplexer. An avalanche photo-diode (APD) 79 converts the optical signal into a corresponding electric signal. A demultiplexer (BYTE DMUX) 80 N-demultiplexes the electric signal, and an extracting unit (S/L OH DROP) 81 demultiplexes SOH and LOH for the high-order signal from one of the N demultiplexed signals. The signal is passed through a path switch unit (PATH SW) 82 and is applied to a inserting unit (S/L OH INS) 83. The inserting unit 83 inserts SOH and LOH for the low-order signal into the input signal. A coder (COD) 84 converts the input signal of a NRZ-code signal into a corresponding B8ZS-code signal. A converter (U/B) 85 converts the B8ZS-code signal of a unipolar signal into a corresponding bipolar signal being then output as a received signal ROUT of the 50 Mbps STS-1 signal via a line building-out unit (LBO) 86.

A determining unit 87 is coupled with the inserting unit 76 in the transmitter 71 via a terminal 71*a* and coupled with the extracting unit 81 in the receiver 72 via a terminal 72*a*. The determining unit 87 uses the data for detecting line-disconnection troubles being inserted in the LOH being then inserted into the relevant overhead channel of the standardized transmission format of the transmission signal through the inserting unit 76. The determining unit 87 further uses the data for detecting line-disconnection troubles having been extracted from the LOH having been demultiplexed from the relevant overhead channel in the standardized transmission format of the received signal through the extracting unit 81. The determining unit 87 compares the above data for detecting line-disconnection troubles being inserted in the LOH and data for detecting line-disconnection troubles having been extracted from the LOH. If the former data is identical to the latter data, this fact indicating that a line-disconnection trouble has occurred so that an optical signal transmitted from the transmitter 71 is returned so as to be received by the receiver 72, the determining unit 87 outputs a line-disconnection detection signal DET to a supervisory apparatus or the like. The determining unit 87 has functions substantially identical to the determining unit 43 shown in FIG. 3 and has functions adaptable for the transmission system including the transmitter 71 and receiver 72 shown in FIG. 6.

Figure 7:
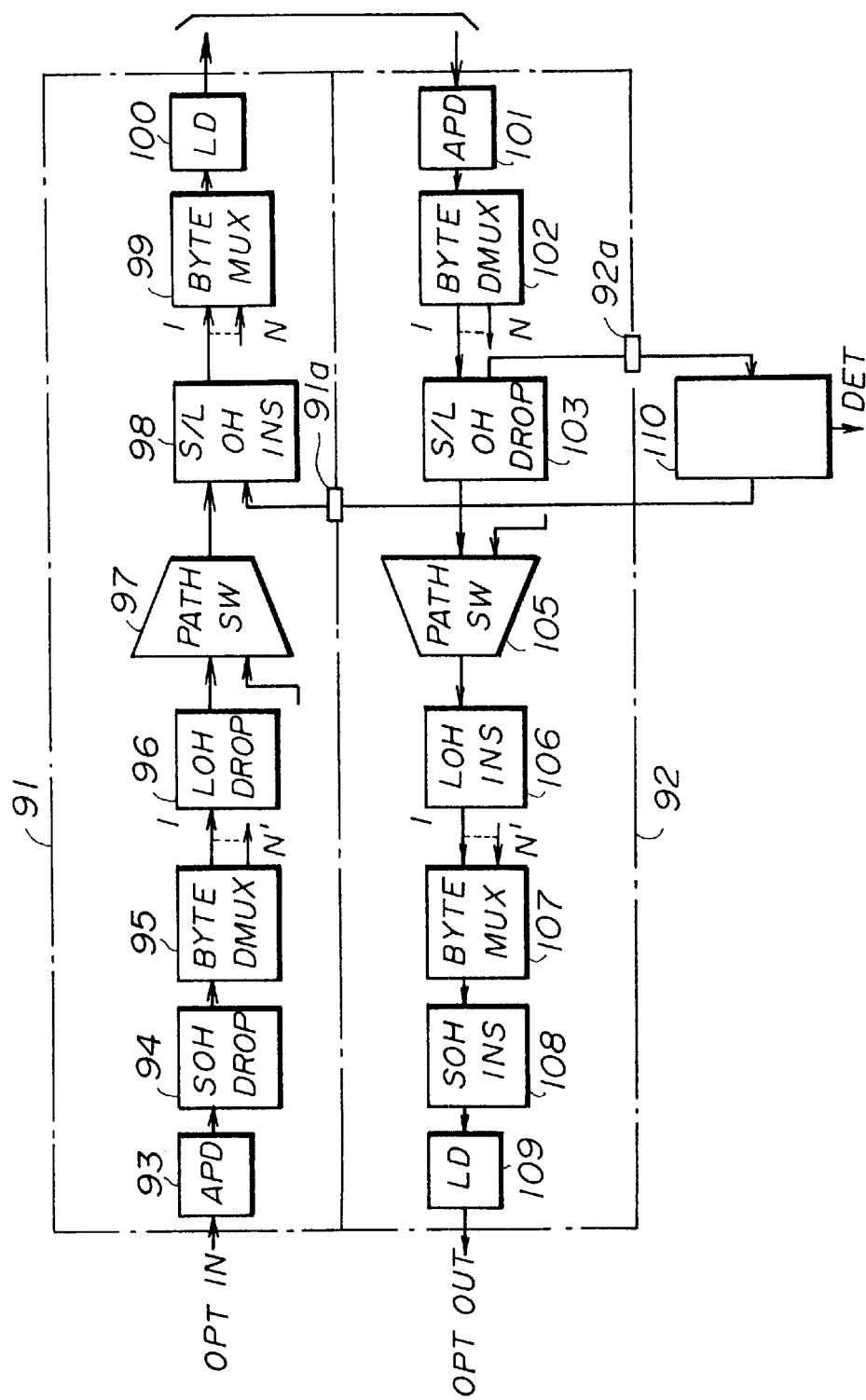
FIG. 7 shows a block diagram of a transmission system in a fifth embodiment of an optical bidirectional transmission system and method according to the present invention.

With reference to FIG. 7, a transmitter 91, a receiver 92 and a determining unit 110 in a fifth embodiment of a bidirectional optical transmission system and method according to the present invention will now be described. These transmitter 91 and receiver 92 having structures according to a standard of the above-described known new synchronous transmission methods, are used in a bidirectional optical transmission system for transmitting an optical signal having a data transfer rate obtained as a result of multiplexing a number of either 150 Mbps or 600 Mbps signals. An optical signal OPTIN of either 150 Mbps or 600 Mbps is converted through an avalanche photo-diode (APD) 93 into a corresponding electric signal in the transmitter 91.

A separating unit (SOH DROP) separates SOH from the electric signal and a demultiplexer (BYTE DMUX) 95 N'-demultiplexes the input signal. If the above optical signal is a signal of 150 Mbps, N' is assumed to be 3 and if the optical signal is a signal of 600 Mbps, N' is assumed to be 12.

As a result, 50 Mbps signals are obtained from the demultiplexer 95. LOH is separated from one of the 50 Mbps signals through an extracting unit 96. A signal from which the LOH has been thus separated out is applied to an inserting unit (S/L OH INS) 98 via a path switch unit (PATH SW) 97. The inserting unit 98 inserts LOH into the applied signal, the LOH including the data for detecting line-disconnecting troubles being inserted by the determining unit 110 via a terminal 91a. A multiplexer (BYTE MUX) 99 N-multiplexes the above signal with other similar signals and a signal resulting from the above multiplexing is converted into a corresponding optical signal through a semiconductor laser device (LD) 100. The optical signal is sent out to a relevant optical transmission line via an optical multiplexer-demultiplexer not shown in the figure. If the above N is 3, a 150 Mbps optical signal is transmitted through the transmission system. Similarly, if N=12, a 600 Mbps optical signal is transmitted and if N=48, a 2.4 Gbps optical signal is transmitted.

In the receiver 92, an optical signal is input via the above optical multiplexer-demultiplexer and an avalanche photodiode (APD) 101 converts the optical signal into a corresponding electric signal. A demultiplexer (BYTE DMUX) 102 N-demultiplexes the electric signal and an extracting unit (S/L OH DROP) 103 separates SOH and LOH from one of signals obtained from the N-demultiplexing. The LOH are used for the determining unit 110 to extract the data for detecting line-disconnection troubles from the LOH.

The determining unit 110 uses the data for detecting line-disconnection troubles being inserted in the LOH being then inserted into the relevant overhead channel of the standardized transmission format of the transmission signal through the inserting unit 98. The determining unit 110 further uses the data for detecting line-disconnection troubles having been extracted from the LOH having been demultiplexed from the relevant overhead channel in the standardized transmission format of the received signal through the extracting unit 103. The determining unit 110 compares the above data for detecting line-disconnection troubles being inserted in the LOH and data for detecting line-disconnection troubles having been extracted from the LOH. If the former data is identical to the latter data, this fact indicating that a line-disconnection trouble has occurred so that an optical signal transmitted from the transmitter 91 is returned so as to be received by the receiver 92, the determining unit 110 outputs a line-disconnection detection signal DET to a supervisory apparatus or the like. The determining unit 110 has functions substantially identical to the determining unit 43 shown in FIG. 3 and has functions adaptable for the transmission system including the transmitter 91 and receiver 92 shown in FIG. 7.

A signal resulting from separating the SOH and LOH therefrom by means of the extracting unit 103 is applied to a inserting unit (LOH INS) 106 via a path switch unit (PATH SW) 105. The inserting unit 106 inserts LOH into the applied signal and a multiplexer (BYTE MUX) 107 N'-multiplexes the above signal with other similar signals. An inserting unit (SOH INS) 108 inserts SOH into a signal obtained from the N'-multiplexing. A resulting signal is converted into optical signal OPTOUT of either 150 Mbps or 600 Mbps through a semiconductor laser device (LD) 109.

In each embodiment of the above first, second, third, fourth and fifth embodiments, the data for detecting line-disconnection troubles can be carried by bytes consisting of bytes having not been used in overhead bytes such as LOH and inserting and extracting of the relevant bytes among the bytes allocated in a relevant overhead channel can be easily achieved as a result of detecting frame synchronization of a relevant signal using the frame synchronous bytes A1 and A2 shown in FIG. 4.

Figure 8:
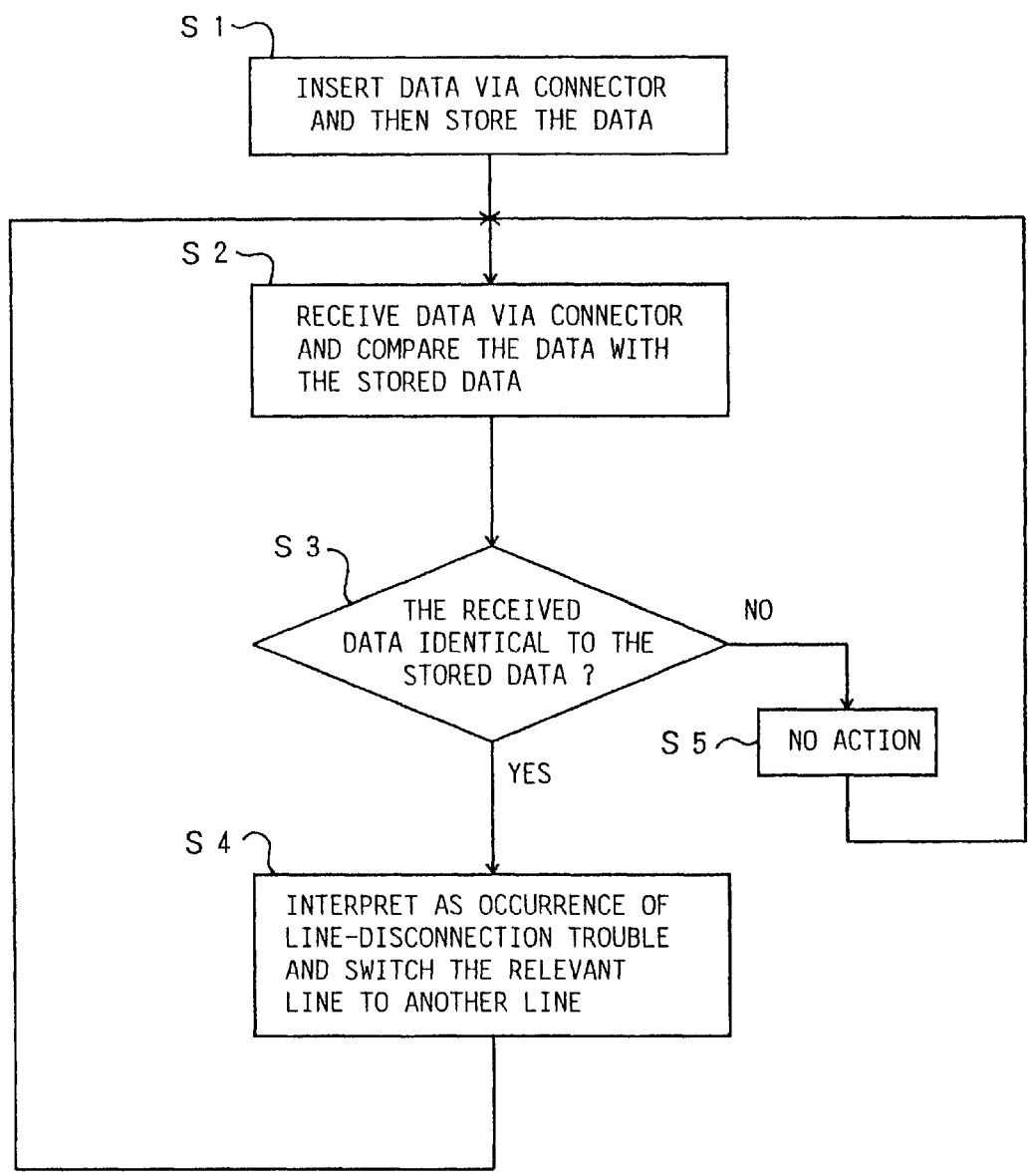
FIG. 8 shows an operation flow of a determining unit used in each of the first through fifth embodiments.

With reference to FIG. 8, an operation flow of an operation carried out by each of the determining units 1a, 1b (shown in FIG. 2), 43 (shown in FIG. 3), 69 (shown in FIG. 5), 87 (shown in FIG. 6 and 110 (shown in FIG. 7) will now be described. In a step S1 (the term 'step' is omitted, hereinafter), the determining unit inserts the data for detecting line-disconnection troubles via the relevant connector of the transmitter. The relevant connector is a connector for accessing, for example, the Z1 byte of the LOH shown in FIG. 4 so that the thus inserted data is set as the Z1 byte of the LOH to be transmitted together with relevant user data in a transmission signal. The determining unit stores the thus inserted data for detecting line-disconnection troubles.

In S2, the determining unit monitors, in the example, the Z1 byte of the LOH in a reception data channel corresponding to a transmission data channel. The transmission data channel is one in which the determining unit has inserted, in S1, the data for detecting line-disconnection troubles to be set as the Z1 byte of the LOH. The Z1 byte of the LOH to be monitored in S2 is received from the data channel of a received signal via the relevant connector of the receiver. The relevant connector is a connector for receiving, in the example, the Z1 byte of the LOH. The determining unit compares the thus received data for detecting line-disconnection troubles with the data for detecting line-disconnection trouble stored in S1. The comparison is carried out every time the relevant Z1 byte is received. If the received data is not identical to the stored data in S3, no particular action is performed in S5 since the being not identical indicates that no particular trouble has occurred in a relevant transmission line, an optical cable. Then, S2 is again carried out. On the other hand, if the received data is identical to the stored data, the determining unit interpret the comparison result as an indication indicating that line-disconnection trouble has occurred in the relevant transmission line. The determining unit then switches the relevant transmission line to another line. Thus, the transmission line considered to have a line-disconnection trouble is removed from the transmitter and receiver and another line having no trouble is connected to the transmitter and receiver. Then, S2 is again carried out. Thus, the determining unit, in S2, continuously monitors the Z1 byte of the LOH in the reception data channel and continuously compares the data for detecting line-disconnection troubles indicated by the monitored byte with the data for detecting line-disconnection troubles stored in S1.

Further, the present invention is not limited to the above described embodiments, and variations and modifications may be made without departing from the scope of the present invention.

What is claimed is:

1. An optical bidirectional transmission system for bidirectional transmission of signals between a first station and a second station via an optical transmission line, the system comprising:

first transmitting means provided in the first station and second transmitting means provided in the second station;

first receiving means provided in the first station and second receiving means provided in the second station;

first inserting means provided in the first station and second inserting means provided in the second station;

first extracting means provided in said first station and second extracting means provided in said second station;

said first transmitting means transmitting a first optical signal to said second receiving means provided in said second station via said optical transmission line, said first optical signal including first intrinsic information and first overhead information;

said first receiving means provided in said first station receiving a second optical signal transmitted from said second transmitting means provided in said second station via said optical transmission line, said second optical signal including second intrinsic information and second overhead information;

said first inserting means provided in said first station inserting first data into a position in said first overhead information, contents of said first data being different from contents of second data being inserted into the position in said second overhead information by said second inserting means provided in said second station;

said first extracting means provided in said first station extracting the data from the position in the overhead information included in an optical signal received by said first receiving means;

first comparising means for comparing said contents of said first data with contents of said data extracted by said first extracting means; and first determining means for determining that a line-disconnection trouble occurs in said optical transmission line if comparison made by said first comparing means has resulted in that said contents of said first data are identical to said contents of said data extracted by said first extracting means, and determining that no line-disconnection troubles occur in said optical transmission line if comparison made by said first comparing measn has resulted in that said contents os said first data are different from said contents of said data extracted by said first extracting means.

2. The optical bidirectional transmission system according to claim 1, wherein:

said first transmitting means has a terminal via which said first inserting means can insert said first data for detecting line-disconnection troubles into said first overhead information included in said first optical signal to be transmitted to said second receiving means via said first optical transmission line; and said second transmitting means has a terminal via which said first extracting means can extract said data for detecting line-disconnection troubles from said overhead information included in said optical signal received by said first receiving means.

3. The optical bidirectional transmission system according to claim 1, further comprising first optical multiplexing-demultiplexing means provided in said first station and second optical multiplexing-demultiplexing means provided in said second station, said first optical multiplexing-demultiplexing means coupling said first transmitting means and said first receiving means with said optical transmission line;

and wherein said second transmitting means and said second receiving means are coupled with said optical transmission line via said second optical multiplexing-demultiplexing means provided in said second station.

4. The optical bidirectional transmission system according to claim 1, wherein said system is in accordance with a new synchronous transmission method using a data hierarchy, said data hierarchy consisting of data transmitted in a data transfer rate obtained as a result of multiplexing an integer number of data sets, each data set being transmitted at a predetermined reference data-transfer rate.

5. The optical bidirectional transmission system according to claim 4, wherein said new synchronous transmission method is either the synchronous digital hierarchy (SDH) or the synchronous optical network (SONET).

6. The optical bidirectional transmission system according to claim 1, wherein:

said first transmitting means comprises:
overhead allocating means for allocating said first overhead information at an overhead channel in a data transmission format to be carried by said first optical signal;
multiplexing means for multiplexing a plurality of data sets, each data set being transmitted at a reference data-transfer rate, at least one set among said plurality of data sets including said overhead information;
electric-optical signal converting means for converting an electric signal obtained as a result of the multiplexing into a corresponding optical signal;

and said first receiving means comprises:
optical-electric signal converting means for converting an optical signal received by said first receiving means into a corresponding electric signal;
demultiplexing means for demultiplexing said electric signal into a plurality of data sets, each set having a predetermined reference data-transfer rate; and
overhead extracting means for extracting overhead information from an overhead channel in a data transmission format in one of said plurality of data sets.

7. An optical bidirectional transmission method comprising steps of:

a) transmitting a first optical signal from a first station to a second station via an optical transmission line, said first optical signal including first intrinsic information and first overhead information;

b) receiving at said first station a second optical signal transmitted from said second station via said optical transmission line, said second optical signal including second intrinsic information and second overhead information;

c) inserting first data for detecting line-disconnection troubles into said first overhead information at said first station, the data inserting being performed without causing a data amount of said first overhead information to be increased, contents of said first data being different from contents of second data being inserted into said second overhead information at said second station;

d) extracting the data from the overhead information included in an optical signal received at said first station, said data being either said second data if said second optical signal has been received at said first station or said first data if said first optical signal has been received at said first station as a result of returning;

e) comparing said contents of said first data with contents of said data extracted in said step d); and determining that a line-disconnection trouble occurs in said optical transmission line if the comparison made in said step e) determined that said contents of said first data are identical to said contents of said data extracted in said step d), and determining that no line-disconnection troubles occur in said optical transmission line if the comparison made in said step e) determined that said contents of said first data are different from said contents of said data extracted in said step d).

8. The optical bidirectional transmission method according to claim 7, wherein said method is in accordance with a new synchronous transmission method using a data hierarchy, said data hierarchy consisting of data transmitted at a data transfer rate obtained as a result of multiplexing an integer number of data sets, each data set being transmitted at a predetermined reference data-transfer rate.

9. The optical bidirectional transmission method according to claim 8, wherein said new synchronous transmission method is either the synchronous digital hierarchy (SDH) or the synchronous optical network (SONET).

10. The optical bidirectional transmission method according to claim 7, wherein:

said first station is provided with:

overhead allocating means for allocating said first overhead information at an overhead channel in a data transmission format to be carried by said first optical signal;

multiplexing means for multiplexing a plurality of data sets, each data set being transmitted at a reference data-transfer rate, at least one set among said plurality of data sets including said overhead information;

electric-optical signal converting means for converting an electric signal obtained as a result of the multiplexing into a corresponding optical signal;

optical-electric signal converting means for converting an optical signal received at said first station into a corresponding electric signal;

demultiplexing means for demultiplexing said electric signal into a plurality of data sets, each set having a predetermined reference data-transfer rate; and overhead extracting means for extracting overhead information from an overhead channel in a data transmission format in one of said plurality of data sets.

* * * * *